Feb. 6, 1962 H. J. HEIJN ETAL 3,020,117
SYSTEM FOR CONTROLLING A PLURALITY OF WRITING HEAD
Filed May 31, 1957
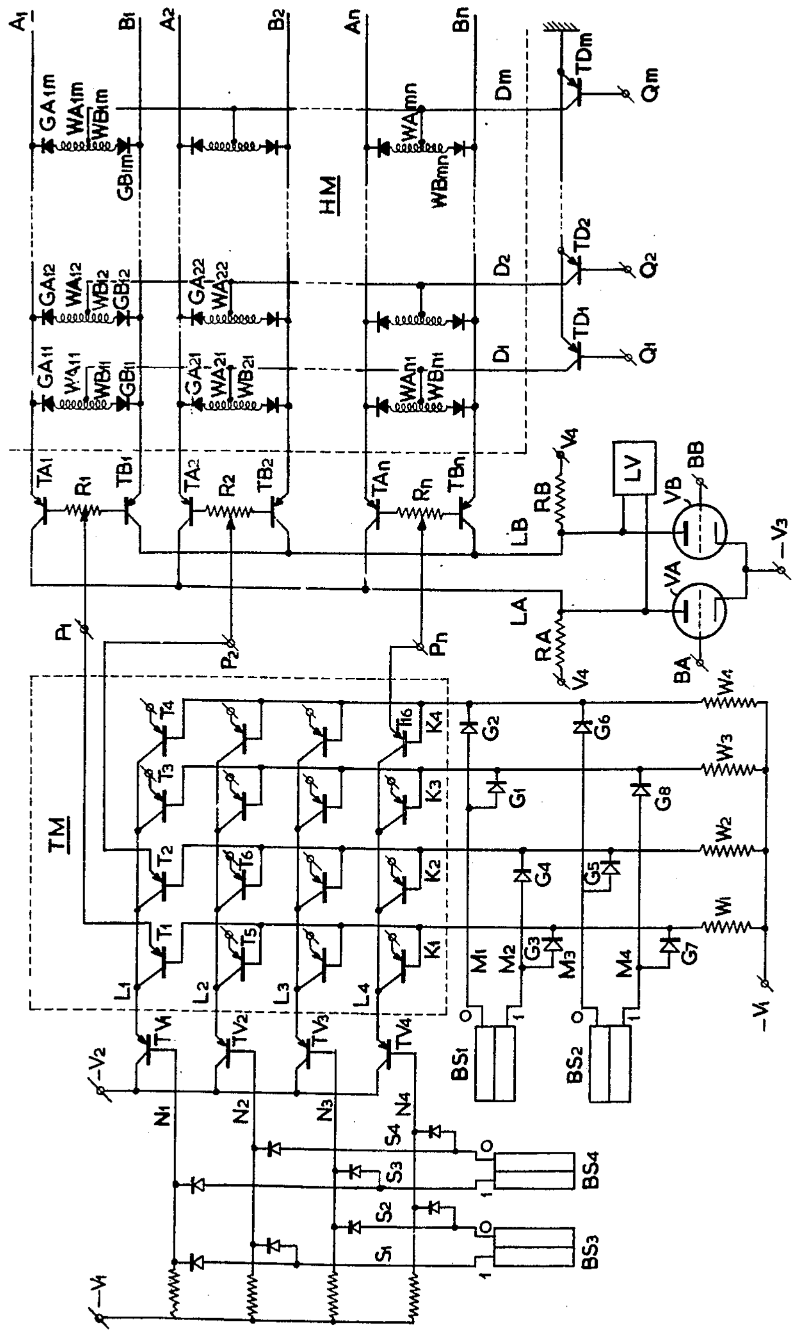
INVENTORS
HERMAN JACOB HEIJN
HEINE ANDRIES RODRIGUES DE MIRANDA
JACOB FREDERIK KLINKHAMER
JOHANNES ARNOLDUS SAMWEL
BY
Frank R. Jifari
AGENT United States Patent Office 3,020,117

Patented Feb. 6, 1962

3,020,117

SYSTEM FOR CONTROLLING A PLURALITY OF WRITING HEADS

Herman Jacob Heijn, Jacob Fredrik Klinkhamer, Johannes Arnoldus Samwel, and Heine Andries Rodrigues de Miranda, all of Eindhoven, Netherlands, assignors to North American Philips Company, Inc., New York, N.Y., a corporation of Delaware Filed May 31, 1957, Ser. No. 662,874
Claims priority, application Netherlands June 5, 1956
1 Claim. (Cl. 346—74)

This invention relates to arrangements for controlling a plurality of writing members of magnetic memories, for example writing heads on magnetic drums in electronic computers.

In known arrangements of this kind, the writing members usually comprise two windings for registering magnetisations in opposite directions. The number of writing heads on a magnetic drum is usually comparatively large, for example 128 or 256, so that the arrangements of known kind comprise a large number of control members, and for each writing head separate means are provided for supplying a writing current.

The present invention provides a simple arrangement for controlling a plurality of writing members using only a comparatively small number of control members. In the arrangement according to the invention, a first winding of each writing member is connected in series with a rectifier in accordance with a matrix between one conductor of a first group of control conductors and one conductor of a second group, whilst a second winding of each writing member is connected in series with a rectifier between the corresponding conductor of the first group and one conductor of a third group. Furthermore, the main current paths of transistors of a first group of transistors are connected between the conductors of the first group of conductors and a point of constant potential, the main current paths of a second group of transistors are connected between the conductors of the second group of conductors and a first writing conductor, and the main current paths of transistors of a third group of transistors are connected between the conductors of the third group of conductors and a second writing conductor. Control electrodes of transistors connected to corresponding conductors of the second group and the third group are coupled together in pairs via a resistor. Selecting means are provided for applying a control voltage to a tapping on one of said resistors and to a control electrode of one transistor of the first group for releasing the transistors concerned and thus selecting one of the writing members. In addition, means are provided for connecting at will one writing conductor to a writing current source.

The number of the control points for selecting one of the writing members is in this arrangement much less than the number of the writing members, the means for supplying a writing current being common to all writing members.

In order that the invention may be readily carried into effect, one embodiment will now be described more fully, by way of example, with reference to the accompanying drawing, showing a plurality of windings WA11, WA12, WA1*m*, WA21 etc., WB11, WB12, WB1*m*, etc., arranged in accordance with a matrix having *m* columns and *n* rows. The windings WA11 and WB11, WA12 and WB12, etc., are associated pairwise with the same writing head (not shown) of a magnetic memory, for example a magnetic drum, on which magnetic records may be written by means of the said windings WA11, WB11, etc., the windings WA11, WA12, etc., serving to register positive magnetisations and the windings WB11, WB12, etc., serving to register negative magnetisations. The number of writing heads is, for example, 256, the matrix being constituted, for example, by 16 columns and 16 rows, in which event the indices *m* and *n* are each equal to 16. The windings WA11, WA12, WA1*m*, WA21 . . . WA*mn* are each connected in series with a rectifier GA11, GA12, etc., between one of the vertical control conductors D1, D2 . . . D*m* and one of the horizontal control conductors A1, A2 . . . A*n*. Similarly, the windings WB11, WB12 . . . WB*mn* are each connected in series with a rectifier GB11, GB12, etc., between one of the vertical control conductors D1, D2 . . . D*m* and one of the horizontal control conductors B1, B2 . . . B*n*. The vertical control conductors D1, D2 . . . D*m* are connected to the collectors of the transistors TD1, TD2 . . . TD*m*, the emitters of which are connected to ground and the bases of which are connected to control points Q1, Q2 . . . Q*m*. The horizontal control conductors A1, A2 . . . A*n* are connected to the emitters of the transistors TA1, TA2 . . . TA*n*, the collectors of which are connected to a writing conductor LA, the horizontal control conductors B1, B2 . . . B*n* being connected in a similar manner to the emitters of the transistors TB1, TB2 . . . TB*n*, the collectors of which are coupled to a writing conductor LB. The bases of the transistors TA1, TB1 and TA2, TB2, etc., are connected together via resistors R1, R2, etc., A tapping on each of these resistors is connected to one of the control points P1, P2 . . . P*n*. The writing conductors LA and LB are connected via resistors RA and RB to a voltage source V4 and also connected to the anodes of writing tubes VA and VB, the cathodes of which are connected to a voltage source —V3 having, for example, a voltage of —100 volts with respect to ground. The tubes VA and VB normally do not convey current. Furthermore, a reading out amplifier LV is included between the writing conductors LA and LB.

A given writing head in the matrix may be selected by supplying in a manner which will be described more fully hereinafter, a comparatively low voltage to one of the control points P1 . . . P*n* and one of the control points Q1 . . . Q*m*. For indicating the writing head with the windings WA12 and WB12, for example, the voltage of control points P1 and Q2 is reduced, resulting in the transistors TA1, TB1 and TD2 becoming conductive. From this ensues a first circuit from ground via the main current path of transistor TD2, conductor D2, winding WA12, rectifier GA12, conductor A1, the emitter-base circuit of transistor TA1, part of resistor R1 to the point P1, and a second circuit from ground via the main current path of transistor TD2, conductor D2, winding WB12, rectifier GB12, conductor B1, the emitter-base circuit of transistor TB1 and the other portion of resistor R1 to point P1. Consequently, the base-collector circuits of the transistors TA1 and TB1 also become conducting. The other transistors are cut off, since the bases have a comparatively high voltage. The rectifiers GA11, GA21, etc., prevent the occurrence of an undesired additional current path between the conductors A1 and D2, for example from conductor A1 via rectifier GA11, winding WA11, conductor D1, winding WA21, rectifier GA21, conductor A2, rectifier GA22 and winding WA22 to conductor D2, in which circuit the rectifier GA21 is prepolarized in the cut-off direction. The magnetic registrations on the magnetic drum, which are scanned by the writing head with the windings WA12 and WB12, may now be read out by means of the reading out amplifier LV, since the input terminals of the reading out amplifier are connected in a conductive manner via conductor LA, transistor TA1 and rectifier GA12 or conductor LB, transistor TB1 and rectifier GB12 to the windings WA12 and WB12, connected in series, on the writing head concerned. The resistor R1, which is included between the bases of the transistors TA1 and TB1, prevents short-circuiting of the windings via said bases. The resistor R1 constitutes a certain damping resistance via the selected windings WA12 and WB12, which affords the advantage that it is not necessary to provide individual damping resistors across the windings of the various writing heads, which otherwise would be required for working at high speed in order to damp away swinging-in phenomena. The reading out amplifier LV is preferably provided with a push-pull input, so that it is sensitive only to the potential difference between the writing conductors LA and LB and insensitive to the level of these voltages, thus avoiding the risk that in selecting another writing head the amplifier would temporarily be overcontrolled due to the resulting voltage variation on the writing conductors LA and LB and could not handle immediately the registrations to be read out. However, it has been found in practice that the internal resistance of the transistors need not be exactly the same, so that upon switching-over to another writing head a certain switching voltage still occurs between the conductors LA and LB, which might lead to overcontrol of the amplifier. By suitable choice of the tappings on resistors R1 . . . R*n* it is possible to eliminate this effect. However, it has been found that in practice the internal resistance of the junction layers of the transistors is liable to vary, so that readjustment would be necessary. This may be avoided by giving point V4 a potential such, for example +25 volts, that the two junction layers of each of the selected transistors TA1 and TB1 are prepolarized in the direction of passage. The internal resistance of the junction does not substantially affect the balancing. The value of resistors RA and RB must then be such that the other transistors remain cut off, viz. a value such that the voltage of the writing conductors LA and LB is higher than that of point P1, but lower than that of the other control points P2 . . . P*n*, the collector-base circuits of the non-selected transistors TA2 . . . TA*n* and TB2 . . . TB*n* thus remaining prepolarized in the cut-off direction.

When a new magnetic registration on the drum is to take place, the voltage on the points BA and BB is controlled in a manner such that the tube VA or VB become conducting. For writing a magnetisation in the positive sense, for example tube VA is made conducting, so that a writing current starts to flow from ground via the main current path of transistor TD2, conductor D2, winding WA12, rectifier GA12, conductor A1, transistor TA1, conductor LA and tube VA to the voltage source —V3. Similarly, when tube VB is made conducting for writing a magnetic registration in the negative sense, current starts to flow from earth via transistor TD2, conductor D2, winding WB12, rectifier GB12, conductor B1, transistor TB1, conductor LB and tube VB.

The writing current is required to be comparatively strong, for example 100 ma. or upwards. For controlling the transistors TA1 . . . TA*n* and TD1 . . . TD*m* via the bases, a control current of the order of magnitude of 10 ma. is then required. In many cases, it is desirable in computers to control the selection of a given writing head by means of trigger circuits having two stable positions. Since the control currents of the transistors cannot be derived directly from the trigger circuit, the control of the input points P1 . . . P*n* and Q1 . . . Q*m* of the described matrix circuit is effected by means of a second matrix circuit having a plurality of transistors T1 . . . T16. The emitters of these transistors are connected to the control points P1 . . . P*n*. The control points Q1 . . . Q*m* may, if desired, also be connected to collectors of this transistor matrix; on the other hand, for controlling points Q1 . . . Q*m*, use may be made, if desired, of a separate transistor matrix TM which is designed in a similar manner as the circuit which will be described hereinafter.

The transistor matrix M is controlled by means of trigger circuits BS1, BS2, BS3 and BS4, which may each occupy two electrically stable positions. In one electric position of trigger BS1, which position will be indicated by 0, the conductor M1 receives a comparatively low poential and the conductor M2 a comparatively high potential, whereas in position 1 the conductor M1 receives a comparatively high potential and the conductor M2 a comparatively low potential. Similarly, the voltage of conductor M3 is low and that of conductor M4 is high, if the trigger BS2 occupies the position 0, and conversely. The conductors M1—M4 are connected in a determined manner via rectifiers G1 . . . G8 to the vertical conductors K1 . . . K4, which are coupled to the bases of the transistors of matrix TM and also via resistors W1 . . . W4 to the voltage source —V1, in a manner such that for any arbitrary combination of positions of the triggers BS1 and BS2 one of the conductors K1 . . . K4 always has a comparatively low potential and the other ones have a comparatively high potential. For decreasing the voltage on control point P1 of the matrix HM, it is necessary to release the transistor T1 of the transistor matrix TM, that is to say the conductor K1 must have a comparatively low potential. Such is the case if the two trigger circuits occupy the position 1, in which the conductors M2 and M4 have a comparatively low potential and the rectifiers G3 and G7 are cut off. The conductors M1 and M3 then have a comparatively high potential, so that the rectifiers G1, G2, G5 and G6 are conducting and also the conductors K2, K3 and K4 have a comparatively high potential. In the conducting position of transistor T1, a current of approximately 1 ma. only flows via the base, but a current of approximately 10 ma. must flow via the collector, viz. a current approximately equal to that which is required to control the transistors TA1 and TB1 during the writing of a registration. Since such a current cannot be derived directly, pre-amplification takes place by means of the transistors TV1 . . . TV4. The collectors of these transistors are connected to the voltage source —V2 and the bases to the conductors N1 . . . N4, the emitters being connected to the conductors L1 . . . L4 of the matrix TM. The conductors N1 . . . N4 are coupled via rectifiers to the conductors S1 . . . S4 in a similar manner as the conductors K1 . . . K4 are connected to the conductors M1 . . . M4. The conductors S1 . . . S4 are connected to the outlets of the trigger circuits BS3 and BS4. The conductor N1 has a comparatively low potential when said two trigger circuits occupy the position 1. The conductors N2, N3, N4 in this case have a comparatively high potential and transistor TV1 is conducting, so that transistor T1 is also conducting, since its base has a low potential.

What is claimed is:

A circuit arrangement for controlling a plurality of writing members of a magnetic memory comprising a plurality of writing heads, each writing head having associated therewith at least two windings for registering magnetic markings in opposite directions on said magnetic memory, a first winding of each writing head being connected in series with a rectifier between one conductor of a first group of control conductors and one conductor of a second group of control conductors, a second winding of each writing head being connected in series with a rectifier between said one conductor of the first group of control conductors and one conductor of a third group of control conductors, a first transistor group, the main current path of each transistor of said first transistor group being connected between a conductor of the first group of conductors and a point of constant potential, a second transistor group, the main current path of each transistor of said second transistor group being connected between a conductor of said second group of conductors and a first writing conductor, a third transistor group, the main current path of each transistor of said third transistor group being connected between a conductor of said third group of conductors and a second writing conductor, the control electrodes of transistors connected to corresponding conductors of said second and third conductor groups being connected together in pairs through a tapped resistor, means for connecting the writing conductors to a writing current source, and selecting means for applying a control voltage to a tap point of one of said tapped resistors and to a control electrode of one transistor of said first transistor group, thereby rendering the selected transistors conductive and thus selecting an associated writing member, a first writing amplifier having a main current path connected in series with said first writing conductor, a second writing amplifier having a main current path connected in series with said second writing conductor, a read-out amplifier connected across said first and second writing conductors, and means for applying writing signals to said writing amplifiers thereby activating a selected writing member.

References Cited in the file of this patent

UNITED STATES PATENTS

| | | |
|---|---|---|
| 2,611,025 | Jankowski | Sept. 16, 1952 |
| 2,719,773 | Karnaugh | Oct. 4, 1955 |
| 2,734,187 | Rajchman | Feb. 7, 1956 |
| 2,765,895 | Higonnet et al. | Oct. 9, 1956 |
| 2,769,592 | Burkhart et al. | Nov. 6, 1956 |
| 2,772,370 | Bruce et al. | Nov. 27, 1956 |
| 2,825,889 | Henle | Mar. 4, 1958 |
| 2,844,811 | Burkhart | July 22, 1958 |
| 2,923,589 | Curtis | Feb. 2, 1960 |
| 2,927,304 | Paquin | Mar. 1, 1960 |
| 2,932,008 | Hoberg | Apr. 5, 1960 |

FOREIGN PATENTS

| | | |
|---|---|---|
| 1,098,208 | France | Mar. 2, 1955 |
| 1,137,717 | France | Jan. 14, 1957 |